United States Patent [19]
van der Meer et al.

[11] Patent Number: 4,888,397

[45] Date of Patent: Dec. 19, 1989

[54] FUNCTIONALIZED POLYPHENYLENE ETHER FROM POLYPHENYLENE ETHER CHAIN TERMINATED WITH PHENOXY MOIETY CONTAINING AMINO AND HYDROXY GROUP

[75] Inventors: Roelof van der Meer, Bergen op Zoom, Netherlands; John B. Yates, III, Glenmont, N.Y.

[73] Assignee: General Electric Company, Schenectady, N.Y.

[21] Appl. No.: 314,866

[22] Filed: Feb. 24, 1989

Related U.S. Application Data

[62] Division of Ser. No. 885,497, Jul. 14, 1986.

[30] Foreign Application Priority Data

Jul. 24, 1985 [NL] Netherlands ................. 8502116

[51] Int. Cl.$^4$ .................. C08L 71/04; C08G 65/48
[52] U.S. Cl. ........................... 525/391; 525/132; 525/149; 525/392; 525/397; 525/426
[58] Field of Search ............... 525/391, 392, 397, 132, 525/149, 426

[56] References Cited

U.S. PATENT DOCUMENTS

| | | | |
|---|---|---|---|
| 4,315,086 | 2/1982 | Ueno et al. | 525/391 |
| 4,654,405 | 3/1987 | Jalbert et al. | 525/391 |
| 4,728,693 | 3/1988 | Dröscher et al. | 525/181 |
| 4,732,938 | 3/1988 | Grant et al. | 525/92 |

FOREIGN PATENT DOCUMENTS 0121974 10/1984 European Pat. Off.
8466452 10/1982 Japan.

Primary Examiner—Harold D. Anderson
Attorney, Agent, or Firm—William H. Pittman; James C. Davis, Jr.

[57] ABSTRACT

Functionalized polyphenylene ethers are prepared by mixing with various functionalized olefinic or acetylenic compounds in the melt, in the absence of free radical initiator. They are useful in the preparation of compositions comprising polyphenylene ethers and polyamides or polyesters.

27 Claims, No Drawings

FUNCTIONALIZED POLYPHENYLENE ETHER FROM POLYPHENYLENE ETHER CHAIN TERMINATED WITH PHENOXY MOIETY CONTAINING AMINO AND HYDROXY GROUP

This application is a division of application Ser. No. 885,497, filed July 14, 1986.

This invention relates to the functionalization of polyphenylene ethers, and to uses for the polyphenylene ethers so functionalized.

Various compositions comprising polyphenylene ethers (also known as polyphenylene oxides) and polyamides or linear polyesters, illustrated by Nylon-6, Nylon-66, poly(ethylene terephthalate) and poly(butylene terephthalate), are of interest because of their high solvent resistance and potentially high impact strength. However, such compositions typically undergo phase separation and delamination because of the presence therein of large, incompletely dispersed polyphenylene ether particles and the lack of phase interaction between the two resin phases.

According to U.S. Pat. No. 4,315,086 and European patent application No. 24,120, compositions comprising polyphenylene ethers and polyamides, having high impact strength and solvent resistance, may be prepared by melt blending the two polymers with various olefinic or acetylenic carboxylic acids, functional derivatives thereof or other functionalized compounds, and optionally with impact modifiers such as high impact polystyrenes and partially hydrogenated styrene-butadiene block copolymers. Japanese Kokai 84/66452 describes similar compositions prepared by using a polyphenylene ether which has been pretreated with a similar olefinic compound in the mandatory presence of a free radical initiator. There is, however, continuing interest in preparing compositions of this type having still higher impact strengths and other improvements in properties.

A principal object of the present invention, therefore, is to provide functionalized polyphenylene ethers which form compatible compositions when blended with such polymers as polyamides and linear polyesters.

A further object is to provide polyphenylene ether-polyamide compositions having high impact strength and solvent resistance.

Other objects will in part be obvious and will in part appear hereinafter.

In one of its aspects, the present invention is directed to a method for functionalizing a polyphenylene ether which comprises mixing said polyphenylene ether in the melt, in the absence of free radical initiators, with at least one functionalizing compound having within its molecular structure at least one carbon-carbon double or triple bond and at least one carboxylic acid, acid anhydride, acid amide, imide, ester, amino or hydroxy group.

The polyphenylene ethers used in the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

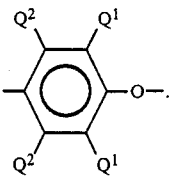

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

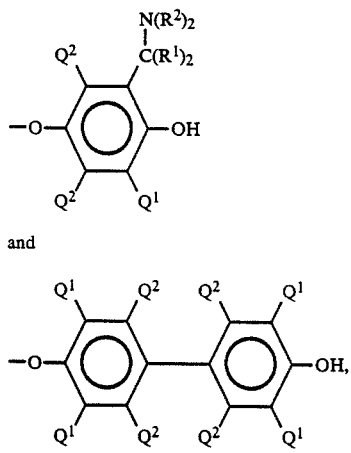

and wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principle site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

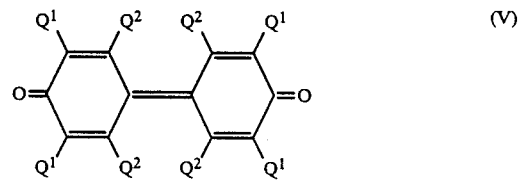

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The functionalizing compound employed according to the present invention, as previously described, contains one or more carbon-carbon double and/or triple bonds in combination with various functional groups including amino, hydroxy, carboxylic acid and carboxylic acid derivative groups. Illustrative compounds of this type are maleic acid, fumaric acid, maleic anhydride, maleimides such as N-phenylmaleimide and 1,4-phenylene-bis-methylene-α,α'-bismaleimide, maleic hydrazide, methylnadic anhydride, fatty oils (e.g., soybean oil, tung oil, linseed oil, sesame oil), unsaturated carboxylic acids such as acrylic acid, crotonic acid, methacrylic acid and oleic acid, unsaturated alcohols such as allyl alcohol and crotyl alcohol and unsaturated amines such as allylamine. The preferred compounds are maleic anhydride, maleimides and fumaric acid, particularly the latter by reason of its availability, relative non-toxicity and low activity as a skin and eye irritant.

The functionalized polyphenylene ethers may be conveniently prepared by merely blending the two reagents under conditions adapted for the formation of an intimate blend, and at temperatures high enough to prepare a melt. Typical temperatures are within the range of about 230°–390° C. The fact that some type of interaction takes place in the absence of free radical initiators, and that the product is useful for compatibilizing blends as described hereinafter, is quite unexpected in view of the aforementioned Japanese Kokai 84/66452, which explicitly states by way of comparative test results that such products are of little or no utility for this purpose.

The proportions of polyphenylene ether and functionalizing compound are not critical, provided the functionalizing compound is used in minor proportions compared to the polyphenylene ether. Most often, about 0.01–5.0 parts and preferably about 0.1–3.0 parts of functionalizing agent are present per 100 parts of polyphenylene ether.

The mixing conditions often include extrusion, which may be conveniently effected in a screw-type or similar extruder which supplies a substantial shearing force to the composition. In certain instances, it may be advantageous to vacuum vent the extruder by connecting the vent thereof to a vacuum pump capable of drawing a vacuum of about 20 torr or less. It is also sometimes found advantageous to extrude the mixture more than once, thereby ensuring effective blending.

The precise chemical nature of the functionalization which takes place upon practice of the method of this invention is not known with certainty. It is believed that an esterification reaction occurs to some extent between compounds such as maleic anhydride or fumaric acid and the terminal hydroxy groups on the polyphenylene ether, particularly on the 4-hydroxybiphenyl end groups of formula III. Another possible reaction is of the Diels-Alder type between maleic acid, maleimide, fumaric acid or the like and the quinone methide of formula IV. However, said reactions are not presently believed to account for the high activity of the functionalized polyphenylene ether when combined with polyamides and polyesters. The principal reaction (if any) is more likely a thermally initiated free radical interaction of the carbon-carbon double or triple bonds with the aromatic rings or the substituents thereon, especially the latter, to produce a product which may include single moieties and/or grafted side chains derived from the functionalizing agent. There may also be some degree of amine salt formation by reaction of the acidic groups with amines generated during formation of the quinone methide-type intermediate of formula IV. However, the invention is in no way dependent on theory.

As more fully described hereinafter, a principal utility of the functionalized polyphenylene ethers of this invention is in the preparation of polyphenylene ether-polyamide compositions. Such compositions may also contain other resinous materials such as polystyrenes and impact modifying resins, and it is frequently preferred to melt-blend at least one such other resinous material, especially an impact modifier, with the polyphenylene ether and the functionalizing compound.

The term "polystyrene" as used herein includes resins comprising polymers which contain at least 25% by weight of structural units derived from a monomer of the formula

wherein $R^3$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2–30% diene monomer. These rubber-modified polystyrenes include high impact polystyrene, or HIPS.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, ethylene-acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Pat. No. 1,264,741, all incorporated herein by reference. Exemplary of typical species of AB block copolymers there may be given:
polystyrene-polybutadiene (SBR)
polystyrene-polyisoprene and
poly(alpha-methylstyrene)-polybutadiene.
Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include:
polystyrene-polybutadiene-polystyrene (SBS),
polystyrene-polyisoprene-polystyrene (SIS),
poly($\alpha$-methylstyrene)-polybutadiene-poly($\alpha$-methylstyrene) and
poly($\alpha$-methylstyrene)-polyisoprene-poly($\alpha$-methylstyrene).
Particularly preferred triblock copolymers are available commercially as CARIFLEX®, KRATON D® and KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester elastomers.

The proportion of impact modifier or other resinous material is subject to wide variation. Generally, about 1–150 parts by weight of styrene homopolymer or HIPS is employed per 100 parts of polyphenylene ether. Impact modifiers such as diblock or triblock copolymers are usually present in an amount up to about 50 parts per 100 parts of polyphenylene ether.

The preparation of the functionalized polyphenylene ethers of this invention is illustrated by the following examples. All parts and percentages are by weight. The polyphenylene ether used in these examples was a poly-(2,6-dimethyl-1,4-phenylene ether) having a number average molecular weight of about 20,000 and an intrinsic viscosity in chloroform at 25° C. of 0.48–0.49 dl./g.

EXAMPLES 1–3

Mixtures of polyphenylene ether, maleic anhydride and, in Examples 2 and 3, a triblock copolymer were extruded in a Werner-Pfleiderer twin screw extruder at 300 rpm. and 285° C. The triblock copolymer used was a partially hydrogenated styrene-butadiene-styrene copolymer having a styrene-butadiene ratio of 27:73 and a number average molecular weight of about 74,000. The proportions of ingredients are given in Table I.

TABLE I

| Example | Parts | | |
|---|---|---|---|
|  | 1 | 2 | 3 |
| Polyphenylene ether | 100 | 90 | 80 |
| Maleic anhydride | 1 | 0.5 | 0.5 |
| Block copolymer | — | 10 | 20 |

The products were the desired functionalized polyphenylene ethers.

EXAMPLES 4–5

Mixtures of 49 parts of polyphenylene ether, 10 parts of the triblock copolymer of Examples 1–3 and various proportions of fumaric acid were tumble mixed on a roll mill for 30 minutes and extruded in a Welding Engineers twin screw extruder at 400 rpm. and 288° C., with full vacuum vent, to yield the desired functionalized polyphenylene ethers. The proportions of fumaric acid used were as follows:
Example 4—0.7 part
Example 5—1.5 parts.

EXAMPLES 6–10

By a procedure similar to that of Examples 1–3, functionalized polyphenylene ethers were prepared from 46 parts of polyphenylene ether, 0.6 part of fumaric acid and 12 parts of the following impact modifiers:
Example 6—75% of a triblock copolymer similar to that of Example 1 but with a somewhat higher molecular weight, 25% of an EPDM rubber.
Example 7—100% of the triblock copolymer of Example 6.
Example 8—75% of the triblock copolymer of Example 1, 25% of the EPDM rubber of Example 6.

Example 9—75% of a partially hydrogenated styrene-isoprene (26:74) diblock copolymer, 25% of the EPDM rubber of Example 6.

Example 10—100% of the diblock copolymer of Example 9.

As previously noted, the functionalized polyphenylene ether prepared by the method of this invention are useful in the preparation of blends of polyphenylene ethers with polyamides and linear polyesters. In particular, another aspect of the invention is a method for preparing a polyphenylene ether-polyamide composition which comprises:

(A) mixing at least a portion of said polyphenylene ether in the melt, in the absence of free radical initiators, with at least one functionalizing compound as described hereinabove, thereby producing a functionalized polyphenylene ether; and subsequently (B) melt-blending said functionalized polyphenylene ether with at least one polyamide; with the proviso that there is also blended into said composition at least one impact modifying resin for polyphenylene ether-polyamide compositions.

Suitable polyamides may be made by any known method, including the polymerization of a monoamino-mono-carboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula H$_2$N(CH$_2$)$_n$NH$_2$ wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

HOOC—Y—COOH wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include, for example, polyamide-6, 66, 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

Linear polyesters which may be blended with the functionalized polyphenylene ethers include thermoplastic poly(alkylene dicarboxylates) and alicyclic analogs thereof. They typically comprise structural units of the formula

(VI)

wherein R$^3$ is a saturated divalent aliphatic or alicyclic hydrocarbon radical containing about 2–10 and usually about 2–6 carbon atoms and A is a divalent aromatic radical containing about 6–20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

The polyphenylene ether which is blended with the polyamide or polyester may be solely functionalized polyphenylene ether prepared by the method of this invention. However, it is also contemplated to include both functionalized and unfunctionalized polyphenylene ether in the blend, the latter being present in the amount up to about 90% by weight of total polyphenylene ether. The polyphenylene ether-polyamide or polyester blend generally contains about 5–75% by weight polyphenylene ether and about 25–95% polyamide or polyester.

According to the method of this invention for preparing polyphenylene ether-polyamide compositions, there is also blended into said composition at least one of the previously identified impact modifiers. The impact modifier may be introduced at any time during the blending operation, or over an extended time period separate from or concurrent with the addition of other blend constituents.

It is preferred, however, to complete addition of the impact modifier before beginning polyamide addition. More preferably, all of the impact modifier is blended with the polyphenylene ether concurrent with functionalization thereof (i.e., during step A), as described hereinabove.

Blending may be achieved by known methods, typically involving melt blending and extrusion. In one suitable method, the functionalized polyphenylene ether is prepared in a first extruder, preferably in the presence of the impact modifier as previously noted, and subsequently blended in a second extruder with the remaining constituents, including polyamide and any unfunctionalized polyphenylene ether.

It is also possible to perform the entire blending operation in a lateral-feed extruder, in which it is possible to supply constituents at various points. Under these conditions, the polyphenylene ether, the functionalizing agent and preferably the impact modifier are supplied at the rear of the extruder, and any remaining constituents are supplied at one or more points nearer its outlet.

The effect on the properties of polyphenylene ether-polyamide compositions of the functionalized polyphenylene ethers prepared by the method of this invention is illustrated by the following examples.

EXAMPLE 11

A blend containing the functionalized polyphenylene ether of Example 1, in combination with unfunctionalized polyphenylene ether, polyamide and impact modifier, was prepared by extrusion on a Werner-Pfleiderer twin screw extruder at 300 rpm. and 285° C. The polyamide was a pre-dried polyamide-66 having a number average molecular weight of about 20,000 and a moisture content after drying less than 0.2% by weight. The impact modifier was a nonhydrogenated styrene-butadiene-styrene triblock copolymer having a styrene-butadiene ratio of 28:72 and a number average molecular weight of about 80,000.

The relative proportions and parameters are given in Table II, in comparison with a control using unfunctionalized polyphenylene ether and maleic anhydride. Proportions of constituents are in parts by weight.

TABLE II

| | Example 11 | Control |
|---|---|---|
| Polyphenylene ether: | | |
| Unfunctionalized | 24.5 | 49 |
| Product of Example 1 | 24.5 | — |
| Polyamide | 41 | 41 |
| Block copolymer | 10 | 10 |
| Maleic anhydride | — | 0.25 |
| Tensile strength upon fracture, MPa. | 59 | 59 |
| Elongation upon fracture, % | 55 | 63 |
| Izod impact strength (notched), joules/m. | 332 | 240 |
| Falling dart impact, joules | 220* | 170 |

*Did not fracture.

The results in Table II show the advantages with respect to impact strength provided by using a functionalized polyphenylene ether prepared by the method of this invention.

EXAMPLES 12–13

Polyphenylene ether-polyamide compositions containing the products of Examples 2–3 were prepared by extrusion as described in Example 6. The relative proportions and parameters are given in Table III. The controls are blends prepared similarly, but not containing the functionalized polyphenylene ethers.

TABLE III

| | Example | | Control | | | |
|---|---|---|---|---|---|---|
| | 12 | 13 | A | B | C | D |
| Polyphenylene ether: | | | | | | |
| Unfunctionalized | — | — | 45 | 45 | 45 | 45 |
| Product of Example 2 | 50.25 | — | — | — | — | — |
| Product of Example 3 | — | 55.25 | — | — | — | — |
| Polyamide | 50 | 45 | 45 | 45 | 45 | 45 |
| Block copolymer | — | — | 10 | 10 | 10 | 10 |
| Maleic anhydride | — | — | 0.25 | 0.05 | 0.2 | 1.0 |
| Thermal stabilizers | 0.4 | 0.4 | 0.4 | — | — | — |
| Tensile strength upon fracture, MPa | 70.1 | 61.2 | 51.7 | 53.9 | 56.3 | 54.9 |
| Elongation upon fracture, % | 42 | 72 | 45 | 35 | 52 | 81 |
| Izod impact strength (notched), joules/m. | 220 | 605 | 145 | 157.5 | 217.5 | 252.5 |
| Falling dart impact, joules | 210 | 217 | 133 | 82 | 215 | 189 |

The results in Table III show the improvement in tensile strength resulting from the preparation of a functionalized polyphenylene ether in combination with the impact strength improving agent. For the most part, there is also an improvement in falling dart impact, and, in the case of Example 13, Izod impact strength also.

EXAMPLES 14–15

Polyphenylene ether-polyamide compositions containing the functionalized polyphenylene ethers of Examples 4–5, in combination with the polyamide of Example 11 and the impact modifier of Examples 1–3, were prepared by tumble mixing the ingredients on a roll mill for 30 minutes and extruding in a Welding Engineers twin screw extruder at 400 rpm. and 288° C., with full vacuum vent. The relative parameters and test results are given in Table IV. The controls were prepared similarly, using unfunctionalized polyphenylene ether and including fumaric acid in the blends.

TABLE IV

| | Example 14 | Example 15 | Control | | |
|---|---|---|---|---|---|
| | | | A | B | C |
| Polyphenylene ether composition: | | | | | |
| Unfunctionalized | — | — | 49 | 49 | 49 |
| Product of Example 4 | 59.7 | — | — | — | — |
| Product of Example 5 | — | 60.5 | — | — | — |
| Polyamide | 41 | 41 | 41 | 41 | 41 |
| Block copolymer | — | — | 10 | 10 | 10 |
| Fumaric acid | — | — | 0.15 | 0.35 | 0.7 |
| Izod impact strength, notched), joules/m. | 748 | 721 | <50 | <50 | <50 |

In these examples, the effect of preparing a functionalized polyphenylene ether according to the method of this invention, in combination with an impact improving polymer, is evident.

EXAMPLES 16–20

Blends are prepared by the procedures of Examples 11–15, substituting for the polyamide-66 a similar polyamide-6. Comparable results are obtained.

EXAMPLES 21–25

By a procedure similar to that of Example 11, 58.6 parts of a functionalized polyphenylene ether (containing impact modifier) was extruded with 40 parts of a polyamide-66 and 0.4 part of a hindered phenol stabilizer. The extrudates were molded into test specimens and various physical properties were determined. Comparison was made with controls in which the same ingredients were blended and subjected to a single extrusion. The results are given in Table V, with corresponding controls designated "C".

TABLE V

|  | Example | | | | | | | |
|---|---|---|---|---|---|---|---|---|
|  | 21 | 21C | 22 | 23 | 23C | 24 | 24C | 25 |
| Functionalized polyphenylene ether | 6 | — | 7 | 8 | — | 9 | — | 10 |
| Izod impact strength (notched), joules/m. | 577 | 48 | 587 | 443 | 198 | 523 | 150 | 545 |
| Tensile strength, MPa. | 50 | 50 | 52 | 50 | 51 | 51 | 50 | 50 |
| Tensile yield, MPa. | 56 | 50 | 59 | 54 | 54 | 59 | 48 | 57 |
| Elongation, % | 61 | 25 | 42 | 68 | 77 | 42 | 80 | 40 |
| Heat distortion temp., °C. | 188 | 184 | 188 | 191 | 189 | 189 | 187 | 190 |

Again, the improved impact strength resulting from the blending method of this invention is apparent.

What is claimed is:

1. A method for functionalizing a polyphenylene ether containing a substantial proportions of end groups of the formula

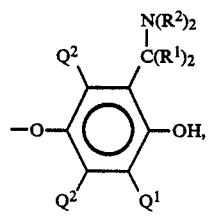

wherein:
each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;
each $Q^2$ is independently hydrogen, halogen, primary or secondary lower alkyl, phenyl, haloalkyl, hydrocarbonoxy or halohydrocarbonoxy as defined for $Q^1$;
each $R^1$ is independently hydrogen or alkyl, the total number of carbon atoms in both $R^1$ radicals being 6 or less; and
each $R^2$ is independently hydrogen or $C_{1-6}$ primary alkyl;
which comprises mixing said polyphenylene ether in the melt, in the absence of free radical initiators, with at least one functionalizing compound having within its molecular structure at least one carbon-carbon double or triple bond and at least one carboxylic acid, acid anhydride, acid amide, imide, ester, amino or hydroxy group.

2. A method according to claim 1 wherein the polyphenylene ether comprises a plurality of structural units having the formula

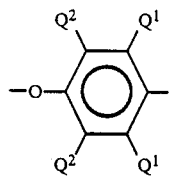

3. A method according to claim 2 wherein the mixture also contains an impact modifying resin for polyphenylene ether-polyamide compositions.

4. A method according to claim 2 wherein the mixture also contains a styrene homopolymer or high impact polystyrene.

5. A method according to claim 3 wherein the functionalizing compound is maleic anhydride, a maleimide or fumaric acid.

6. A method according to claim 3 wherein the polyphenylene ether is a poly(2,6-dimethyl-1,4-phenylene ether).

7. A method according to claim 6 wherein the functionalizing compound is maleic anhydride.

8. A method according to claim 6 wherein the functionalizing compound is fumaric acid.

9. A method according to claim 6 wherein the impact modifying resin is a diblock or triblock copolymer of styrene and at least one olefin or conjugated diene, any conjugated diene block being non-hydrogenated or partially or entirely hydrogenated, and is present in an amount up to about 50 parts by weight per 100 parts of polyphenylene ether.

10. A method according to claim 6 wherein the temperature of mixing is within the range of about 230°-390° C.

11. A functionalized polyphenylene ether prepared by the method of claim 1.

12. A functionalized polyphenylene ether prepared by the method of claim 6.

13. A functionalized polyphenylene ether prepared by the method of claim 8.

14. A method for preparing a polyphenylene ether-polyamide composition which comprises:
(A) mixing in the melt, in the absence of free radical initiators, at least a portion of a polyphenylene ether containing a substantial proportion of end groups of the formula

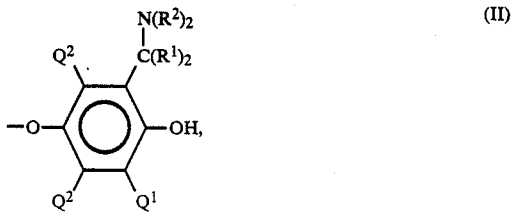

wherein:
each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;

each $Q^2$ is independently hydrogen, halogen, primary or secondary lower alkyl, phenyl, haloalkyl, hydrocarbonoxy or halohydrocarbonoxy as defined for $Q^1$;

each $R^1$ is independently hydrogen or alkyl, the total number of carbon atoms in both $R^1$ radicals being 6 or less; and each $R^2$ is independently hydrogen or $C_{1-6}$ primary alkyl;

with at least one functionalizing compound having within its molecular structure at least one carbon-carbon double or triple bond and at least one carboxylic acid, acid anhydride, acid amide, imide, ester, amino or hydroxy group, thereby producing a functionalized polyphenylene ether; and subsequently (B) melt-blending said functionalized polyphenylene ether with any additional unfunctionalized portion of said polyphenylene ether and with at least one polyamide; with the proviso that there is also blended into said composition at least one of styrene homopolymers, high impact polystyrenes and impact modifying resins for polyphenylene ether-polyamide compositions.

15. A method according to claim 14 wherein the polyamide is nylon-6 or nylon-66 and the polyphenylene ether comprises a plurality of structural units having the formula

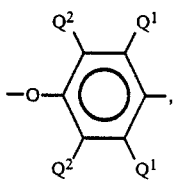

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

16. A method according to claim 15 wherein the impact modifying resin is blended into the composition during step A.

17. A method according to claim 16 wherein the functionalizing compound is maleic anhydride, a maleimide or fumaric acid.

18. A method according to claim 16 wherein the polyphenylene ether is a poly(2,6-dimethyl-1,4-phenylene ether).

19. A method according to claim 18 wherein up to about 90% by weight of the total polyphenylene oxide blended into the composition is unfunctionalized.

20. A method according to claim 18 wherein the functionalizing compound is maleic anhydride.

21. A method according to claim 18 wherein the functionalizing compound is fumaric acid.

22. A method according to claim 18 wherein the impact modifying resin is a diblock or triblock copolymer of styrene and at least one olefin or conjugated diene, any conjugated diene block being non-hydrogenated or partially or entirely hydrogenated, and is present in an amount up to about 50 parts by weight per 100 parts of polyphenylene ether.

23. A method according to claim 18 wherein the temperature of step A is within the range of about 230°–390° C.

24. A method according to claim 18 wherein the polyamide is nylon-66.

25. A polyphenylene ether-polyamide composition prepared by the method of claim 14.

26. A polyphenylene ether-polyamide composition prepared by the method of claim 18.

27. A polyphenylene ether-polyamide composition prepared by the method of claim 21.

* * * * *